May 23, 1961   E. COWCHER ET AL   2,985,852
APPARATUS OF THE KIND INCLUDING A WAVEGUIDE
Filed Jan. 18, 1957   2 Sheets-Sheet 1

INVENTORS
EDWARD COWCHER
JAMES COLMAN PLEDGER
BY
ATTORNEYS

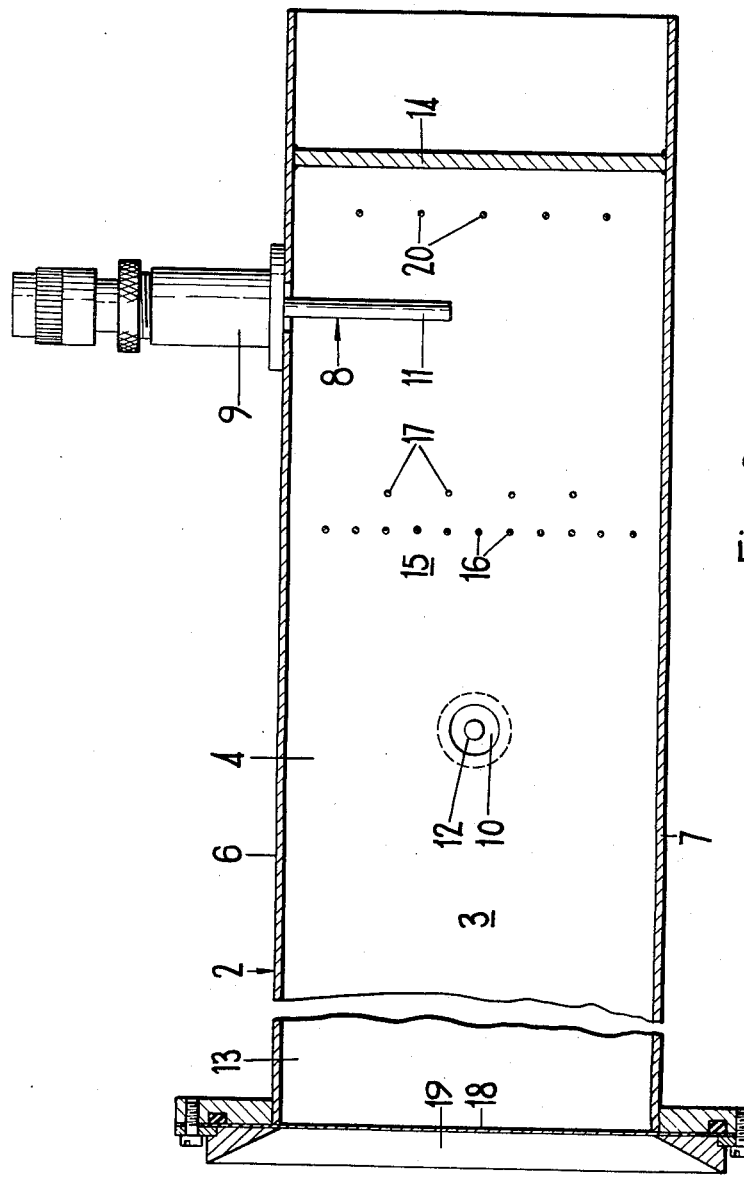

United States Patent Office 2,985,852
Patented May 23, 1961

2,985,852
APPARATUS OF THE KIND INCLUDING A WAVEGUIDE

Edward Cowcher, Harrow, and James Colman Pledger, near Rugby, England, assignors to The General Electric Company Limited, London, England Filed Jan. 18, 1957, Ser. No. 634,923

1 Claim. (Cl. 333—33)

This invention relates to apparatus of the kind including a waveguide.

In British patent specification No. 718,828 there is described a launching device for an aerial system which comprises an open-ended waveguide of rectangular cross-section having two probes that are disposed at right angles to one another so as each to transfer energy between an associated transmission line and the waveguide excited in the $H_{10}$ mode. The two probes thus provide coupling with energy in the waveguide that is polarised in two planes that are at right angles. A plurality of parallel wires is disposed between the two probes so as to form a filter that is adapted to pass electromagnetic energy of that one of said planes of polarisation to which the said probe remote from the open end is capable of coupling but to reflect electromagnetic energy of the other plane of polarisation. The end of the waveguide remote from the open end is closed, for instance, by a plunger.

It is found that, in certain circumstances, there is some tendency with the construction of launching device mentioned above for the space in the waveguide between the said filter and the said plunger to be excited in unwanted modes of which possibly the $H_{11}$ mode is the most serious.

One object of the present invention is to provide an arrangement in which such spurious excitation is reduced.

According to one aspect of the present invention apparatus comprises a waveguide of rectangular cross-section that is terminated at one end, a coupling that is adapted to transfer energy between a transmission line and the waveguide, and a plurality of elongated members that lie across the waveguide between the termination thereof and the said coupling, these elongated members lying in a plane that is at right angles to the longitudinal axis of the waveguide and being parallel to one another, the number of the elongated members of the said plurality of elongated members and the positioning thereof within the waveguide being arranged to inhibit the formation of unwanted modes of propagation in the waveguide.

According to another aspect of the present invention apparatus comprises a waveguide of rectangular cross-section that is terminated at one end, a filter which is disposed within the waveguide and which is formed by a plurality of parallel elongated members that lie across the waveguide, a coupling that is adapted to transfer energy between a transmission line and the portion of the waveguide bounded on one side by the termination and on the other by the said filter when that portion is excited in the $H_{10}$ mode with a plane of polarisation such that the said energy may pass through the said filter, and a plurality of elongated members that lie across the waveguide between the termination thereof and the said coupling, these elongated members lying in a plane that is at right angles to the longitudinal axis of the waveguide and being parallel to one another and to the elongated members of the said filter, the number of elongated members of the said plurality of elongated members and the positioning thereof within the waveguide being arranged to inhibit the formation of unwanted modes of propagation in the waveguide between the said termination and the said filter.

The apparatus may fall within the scope of any claim of British patent specification No. 718,828.

One arrangement of an aerial system that includes a launching device in accordance with the present invention will now be described by way of example with reference to the accompanying drawings in which:

Figure 3 shows a cross-section at the line III—III in Figure 2.

Figure 1:
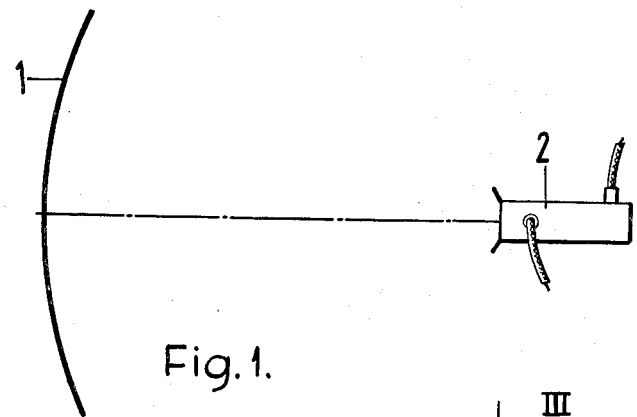
Figure 1 shows diagrammatically the aerial system, which comprises a reflector and a launching device.

The aerial system shown in Figure 1 comprises a parabolic or paraboloidal reflector 1 and a launching device 2 which lies on the axis of the reflector 1, the open end of the launching device 2 being directed towards the reflector 1.

This aerial system is required for duplex operation, transmission in one direction being in the band 1750 to 1900 megacycles per second while transmission in the other direction is in the band 1900 to 2050 megacycles per second. The two radiations have their electric fields plane-polarised in planes that are mutually at right angles.

Figure 2:
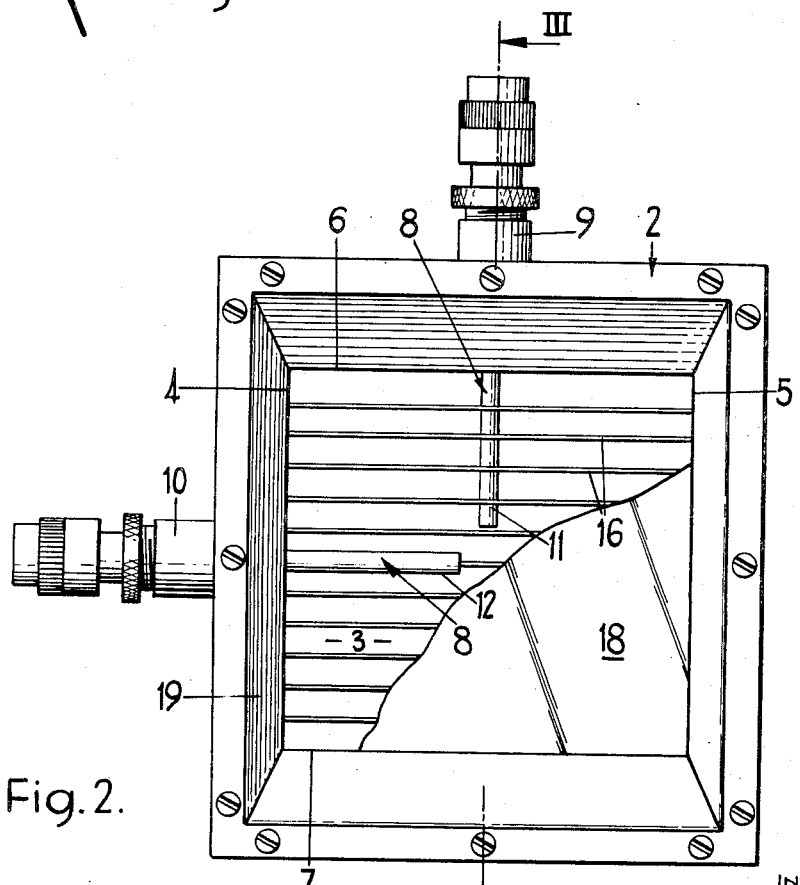
Figure 2 shows an end view of the launching device of Figure 1, partially in section.

Referring now to Figures 2 and 3, the launching device 2 comprises a waveguide 3 of rectangular cross-section. This waveguide is of copper and its internal dimensions are approximately 3.8 and 4.2 inches. During use, this waveguide 3 will be excited in the $H_{10}$ mode, in two planes that are at right angles, by the transmitted and received radiations. In one case the electric lines of force will be parallel to the walls 4 and 5 and in the other case parallel to the walls 6 and 7.

Two couplings 8 are provided between the waveguide 3 and two co-axial transmission lines (not shown in Figures 2 and 3) so that in one case the signal to be radiated may be launched into the waveguide 3 while in the other case the received radiation may be fed into the appropriate transmission line. For this purpose connectors 9 and 10 to which the two transmission lines may be connected have their centre conductors extending into the waveguide 3 as probes 11 and 12. These two probes 11 and 12 are spaced a distance apart longitudinally of the waveguide 3 and each extend from a point mid-way across a wall 6 or 4 of the waveguide 3 approximately half way into the waveguide. The two probes 11 and 12 lie parallel to the walls 4 and 6 respectively. In another construction of launching device, the connectors 9 and 10 are omitted and the inner conductors of the two said co-axial transmission lines extend into the waveguide 3 to form the probes 11 and 12.

The end 13 of the waveguide 3 is open while the other end is closed by a termination 14 formed by a copper plate that lies at right angles to the longitudinal axis of the waveguide 3. The termination 14 is rigidly secured to the walls 4, 5, 6, and 7, of the waveguide 3, for example by soldering right round the edges of the copper plate.

A filter 15, formed by eleven parallel wires 16, is disposed between the two probes 11 and 12. The wires 16 are equally spaced and lie parallel to the probe 10, the ends of the wires 16 being rigidly secured to the walls 4 and 5 of the waveguide 3. Four additional wires 17 are also provided, these additional wires 17 being parallel to and in the shadow of alternate wires 16 (that is to say these wires 17 lie directly behind the appropriate wires 16 relative to the open end 13 of the waveguide 3, there not being a wire 17 behind the centre wire of the wires 16).

The two probes 12 and 11 are disposed approximately a half guide wavelength and a guide wavelength from the open end 13 of the waveguide 3 respectively at the frequencies at which the aerial system is to be used and it will be appreciated that the filter 15 acts as a reflector to the probe 12 for the electromagnetic energy in the waveguide 3 associated with that probe.

The filter 15 has substantially no effect on electromagnetic energy in the waveguide in the other plane of polarisation so that there is substantially no attenuation between the probe 11 and the open end 13 of the waveguide 3 to energy polarised in that other plane. In practice the filter 15 is approximately a quarter wavelength behind the probe 12 while the termination 14 is approximately a quarter wavelength behind the probe 11.

The additional wires 17 have the effect of shifting the resonant frequency of the cavity formed between the filter 15 and the termination 14 which might otherwise cause spurious resonances to be produced. The additional wires 17 also assist the filtering action of the wires 16. The open end 13 of the waveguide 3 is closed by a mica window 18 and is connected to a flare 19 which is directed towards the parabolic or paraboloidal reflector of the aerial system. The launching device may be used with the inside of the waveguide raised to a pressure above atmospheric.

In addition the launching device 2 is provided with five wires 20 that are mounted to lie parallel to one another across the waveguide 3 between the termination 14 and the probe 11. The wires 20 are mounted to lie in a plane that is perpendicular to the longitudinal axis of the waveguide 3 so that they are parallel to the wires 16 and 17, the said plane being located a short distance behind the probe 11 and the wires 20 being regularly spaced across the waveguide 3. The wires 20 may be in the shadow of alternate wires 16 (that is to say the wires 20 lie directly behind the appropriate wires 16 relative to the open end 13 of the waveguide 3, the centre wire of the wires 20 lying behind the centre wire of the wires 16). The plane in which the wires 20 lie is chosen to be in the optimum position to reduce the spurious excitation produced in the space between the probe 11 and the termination 14.

The wires 16, 17, and 20 may be formed of silver steel that has been provided with a thin layer of copper and then silver plated.

In the construction described above the filter 15, the additional wires 17, the five wires 20, and the termination 14, are rigidly secured to the waveguide 3, provision may however be made for any or all of these four elements to be mounted so that they are capable of longitudinal movement in the waveguide 3 in order to determine their optimum positions.

As an alternative the aerial system described need not have a reflector and the open end 13 of the launching device may be directed towards a lens or may be provided with a flare.

We claim:

Apparatus comprising a waveguide of rectangular cross-section that is terminated at one end, a filter which is disposed within the waveguide and which is formed by a plurality of parallel elongated first members that are disposed in a plane perpendicular to the length of the waveguide and parallel to one of the longitudinal walls thereof, a coupling that is adapted to transfer energy between a transmission line and the portion of the waveguide bounded on one side by the termination and on the other side by said filter when that portion is excited in the $H_{10}$ mode with a plane of polarisation such that the said energy may pass through the said filter, and means to inhibit the formation of unwanted modes of propagation in the waveguide between the said termination and the said filter, said means comprising a plurality of second elongated members that are disposed in a plane parallel to the first-named plane and are located across the waveguide between the termination thereof and the said coupling, said second elongated members being parallel to one another and to the first elongated members.

References Cited in the file of this patent

UNITED STATES PATENTS

| 2,362,561 | Katzin | Nov. 14, 1944 |
| 2,398,096 | Katzin | Apr. 9, 1946 |
| 2,476,034 | Fox | July 12, 1949 |
| 2,632,806 | Preston | Mar. 24, 1952 |
| 2,684,469 | Sensiper | July 20, 1954 |

FOREIGN PATENTS

| 233,483 | Switzerland | Nov. 1, 1944 |
| 671,206 | Great Britain | Apr. 30, 1952 |
| 718,828 | Great Britain | Nov. 24, 1954 |